F. S. INGOLDSBY.
DUMP CAR.
APPLICATION FILED APR. 19, 1906.

1,027,850. Patented May 28, 1912.
7 SHEETS—SHEET 1.

Fig.1.

Witnesses
Brennan B. West
Ludo H. Keller

Inventor
Frank S. Ingoldsby
by Bates, Jones & Hull
Attorneys

F. S. INGOLDSBY.
DUMP CAR.
APPLICATION FILED APR. 19, 1906.

1,027,850.

Patented May 28, 1912.

Witnesses
Brennan B. West
Ludo H. Keller.

Inventor
Frank S. Ingoldsby.
by Bates, Fouts & Hull
Attorneys.

F. S. INGOLDSBY.
DUMP CAR.
APPLICATION FILED APR. 19, 1906.

1,027,850.

Patented May 28, 1912.

Witnesses

Inventor
Frank S. Ingoldsby
by Bates, Fouts & Hull
Attorneys.

UNITED STATES PATENT OFFICE.

FRANK S. INGOLDSBY, OF ST. LOUIS, MISSOURI, ASSIGNOR TO THE INGOLDSBY AUTOMATIC CAR COMPANY, OF ST. LOUIS, MISSOURI, A CORPORATION OF WEST VIRGINIA.

DUMP-CAR.

1,027,850.

Specification of Letters Patent.

Patented May 28, 1912.

Application filed April 19, 1906. Serial No. 312,535.

*To all whom it may concern:*

Be it known that I, FRANK S. INGOLDSBY, residing at St. Louis, in the State of Missouri, have invented certain new and useful Improvements in Dump-Cars, of which the following is a full, clear, and exact description, reference being had to the accompanying drawings.

The object of this invention is to provide a steel dump car in a form which shall be cheap in construction and efficient in service. The car is of the Ingoldsby type, wherein there is a central longitudinal beam to the opposite edges of which are pivoted dumping doors adapted to form a portion of the load-sustaining floor and swing downwardly to discharge the load, there being mechanism carried by the longitudinal beam for raising the doors.

The present invention is concerned principally with the form and arrangement of the longitudinal beam and the attachment of the same and the draft plates to the bolster; with the structure and bracing of the bolster; with the door raising mechanism, and its releasing device; with the side sill of the car, and with a cross member for bracing the car sides at their upper edges. These and other features of invention are hereinafter more fully explained and the essential characteristics are set out in the claims.

In the drawings, Fig. 3 is a vertical section of the car, the section being taken through one of the dumping doors.

Figure 4:
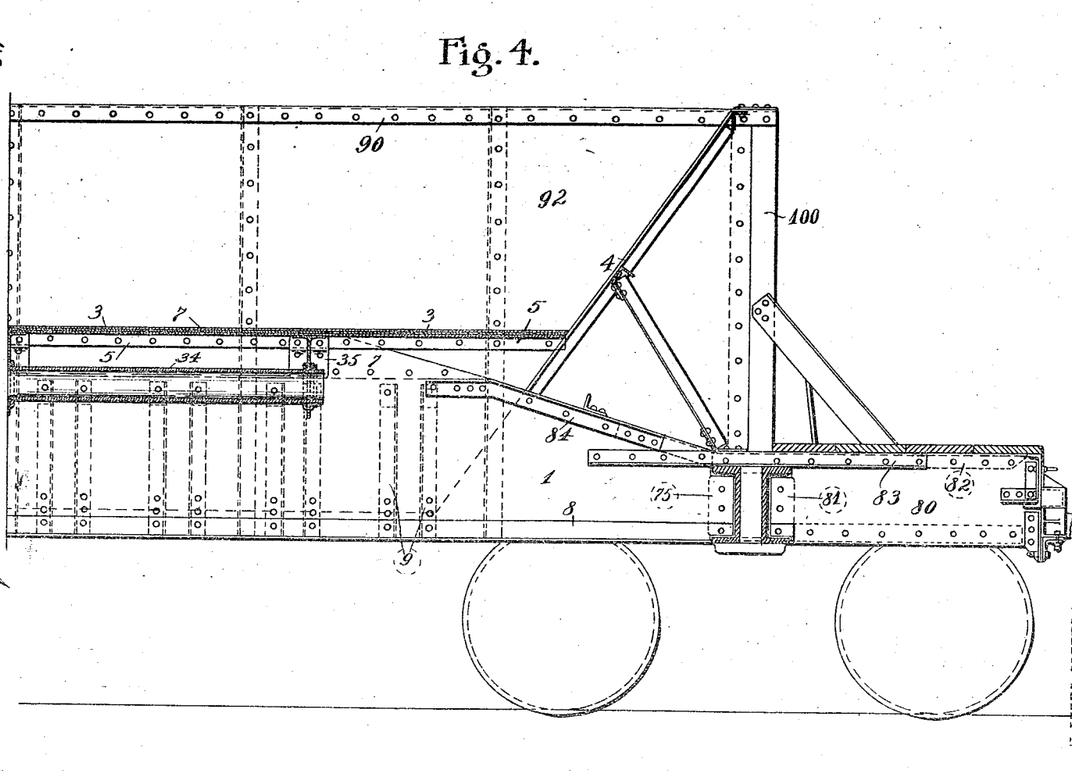
Fig. 4 is a vertical central section of the car.
Figure 5:
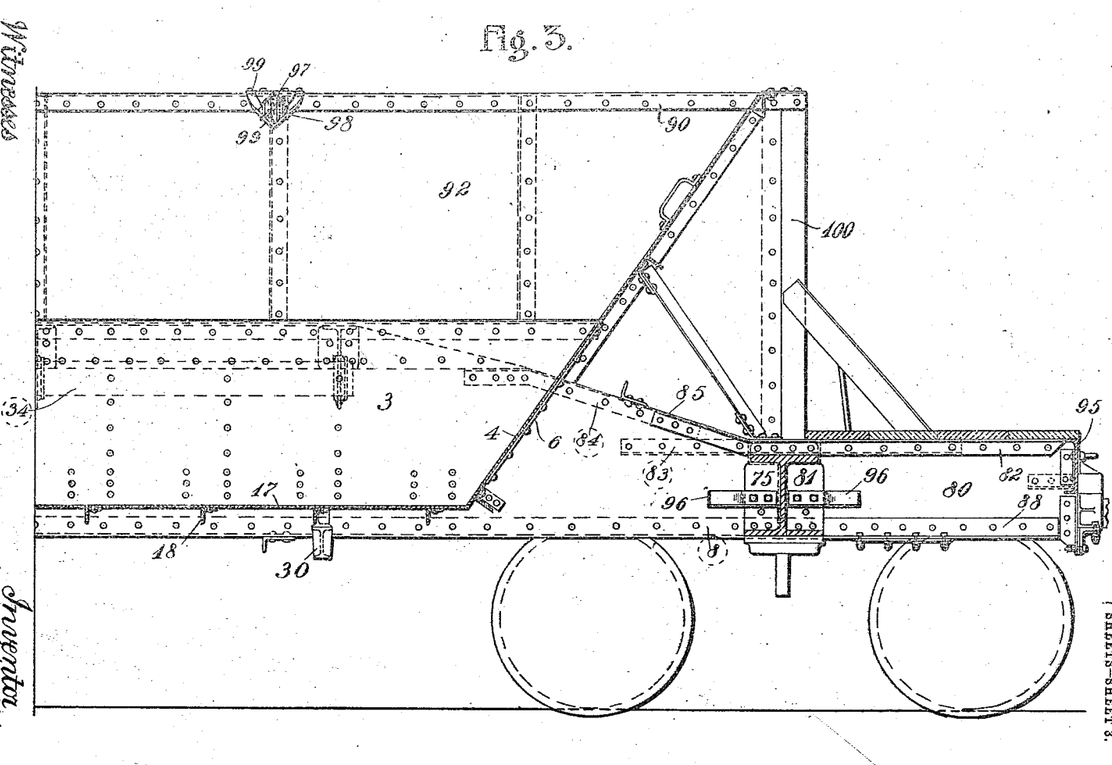
Fig. 5 is an end view.

The central longitudinal beam is of the box girder type, including a pair of parallel plates 1 which extend from the bolster 2 at one end of the car to the bolster at the other end. The upper edges of these plates are cut off diagonally as they approach the bolster, as shown in Figs. 3 and 4. The central beam has cover plates 3 extending from one inclined end floor 4 to the other and secured to the upper bent portion 7 of the plates 1, which lie along the cover plates and are riveted to them intermediate of the end plates. Beneath the ridge thus formed is an angle bar 5 extending from end floor to end floor. The cover plates are secured at their ends to the end floors, being flanged onto the underside thereof, as shown at 6 in Figs. 1 and 3.

The center sill plates 1 carry angles 8 along their lower edges, while at intervals are vertical angles 9 on the outer sides of the plates and riveted to them. Cross bars 10 are riveted to these vertical angles 9 and extend laterally to the cover plates 3 to which they are secured by being riveted to angle strips 11 which are riveted to the cover plates. At their lower edges the cross plates 10 are flanged horizontally, as shown at 12.

The plates 10 and angle bars 9 and 11 are located in pairs at suitable intervals along the central beam, each pair carrying the hinges of the door, and some of the pairs carrying, in addition, the pivots of the raising arms. The doors are indicated by 17. They have angle bar floor beams 18 of which one flange of the angle is bent upon itself to form a hinge-eye 19. A hinge-pin 20 is carried by one flange of the angle strips 11, and by the plates 10, holes being provided through these members to receive the pin. If desired, there may be also a bent member 13, as shown, riveted to the flange 12 and to the cover plate through the adjacent flange of the angle strip 11. These plates, strips and members are provided in pairs, as shown. This makes a very simple and effective support for the door.

Figure 7:
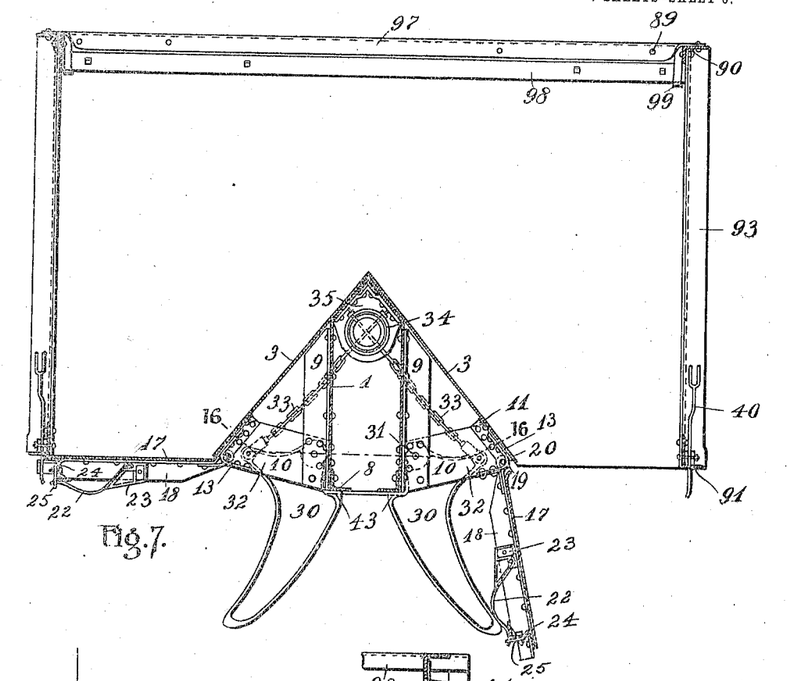
Fig. 7 is a vertical cross section at a point intermediate of the inclined end floors.

To raise the doors, I provide arms 30 which are located between occasional plates 10 and are pivoted on bolts 31 passing through such plates and through the vertical angle bars 9. These arms are formed, as shown in Fig. 7. Their free ends are adapted to bear against the underside of the door and they have bell crank extensions 32 with which are connected chains 33, the upper ends of which are connected with the common operating shaft 34. This shaft is made hollow, as shown, so that it may be light, and at the same time, withstand the torsional and bending strain. The shaft is mounted in bearing blocks having flanges by which they are riveted to the cover plate. The end of the shaft 34 is mounted in a pair of vertical plates 36, 37 secured between the bolster and the upper cross beam 44 to which the end floor is secured. A train of gearing 38 may connect the shaft with the operating crank 39.

The arms 30 are so formed that when they are down they abut the sides of the box girder, and have reinforcing shoulders 43 extending between the same. This makes a rigid abutment, which causes the arm to occupy a proper position to act as a bumper for the door. When the arm is down and the door drops, it engages the lower end of the arm through the intermediacy of a spring 22 carried by the door. This relieves the shock. Extending over the spring on the side toward the pivot of the door is a rub block 23 which, as the door is raised, approaches the point of the arm so that as the door comes into closed position, the point is riding on this rub block and firmly forces the door home. This insures the door being closed, any material clinging to the door being crushed between it and the car side or forced out of the way, as might not be the case if the arm bore upon the spring at all points. The spring rests at its outer end on a Z-bar 24 secured to the door along its lower edge, a stirrup 25 being provided to hold the spring in place.

When the door has been closed, it may be held by hooked pivoted levers 40, which engage hooked ends of the floor beams 18, as is usual in Ingoldsby cars. These levers 40 may be connected by a link 41 with an operating lever 42. The throwing forward of this lever releases the doors, allowing them to drop. To cause such movement of the lever to disengage the winding mechanism so that no damage may be done to the rotating shaft 34, I provide the following mechanism.

Figure 8:
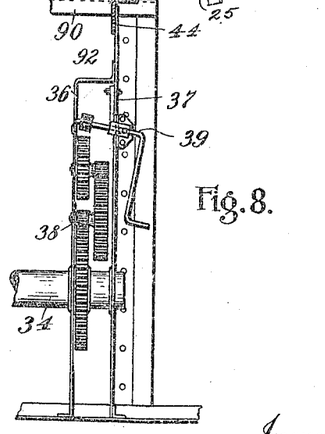
Fig. 8 is a detail showing the winding mechanism.
Figure 9:
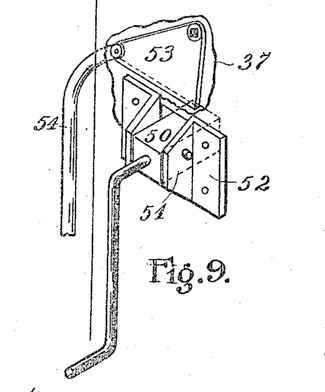
Fig. 9 is a perspective of the retaining mechanism therefor.
Figure 10:
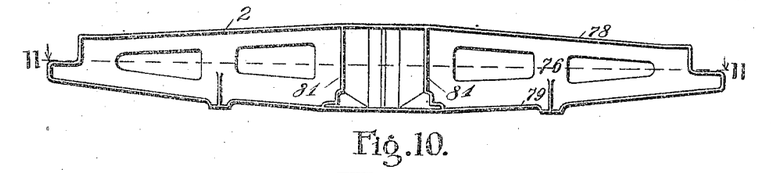
Fig. 10 is a side elevation of the bolster.
Figure 11:
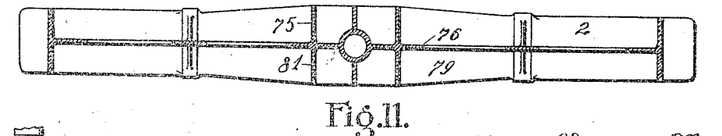
Fig. 11 is a horizontal section of the bolster.

The crank 39 which operates the door raising mechanism is mounted in a block 50 having trunnions 51 occupying the projecting flanges of brackets 52 secured to the plate 37. Above the block 50 is a pivoted pawl 53, and connected with this is a depending link 54. The weight of this link normally holds the plate 53 down, with its lower corner over the block 50, thus holding the pinion on the crank shaft 39 in engagement with the first gear of the train 38. Each of the operating levers 42 is mounted on a rock shaft 46 which has a short rock arm 47 extending beneath the link 54. When the lever is thrown to release the doors, this shaft is rocked and the link 54 is raised, swinging the plate 53 out of engagement with the block 50. This releases the crank, and its superior weight swings the lower end of the crank inward, raising the pinion out of engagement with the gearing, as shown in Fig. 8. In this position, the block 50 comes opposite the side edge of the plate 53, which is thus held against return. This is the normal position with the doors down.

When it is desired to raise the doors, the crank and block 50 are simply swung on their trunnions and the pinion engages with the gearing, and the pawl 53 passes over the block 50, holding the parts in place. Then when the lever 42 is returned to normal position, the arm 47 engages the face of the link bar 54 and simply forces it backward against the action of a spring 55, provided for this purpose, thus allowing the arm 47 to return to normal position.

Figures 12, 13, 14, 15:
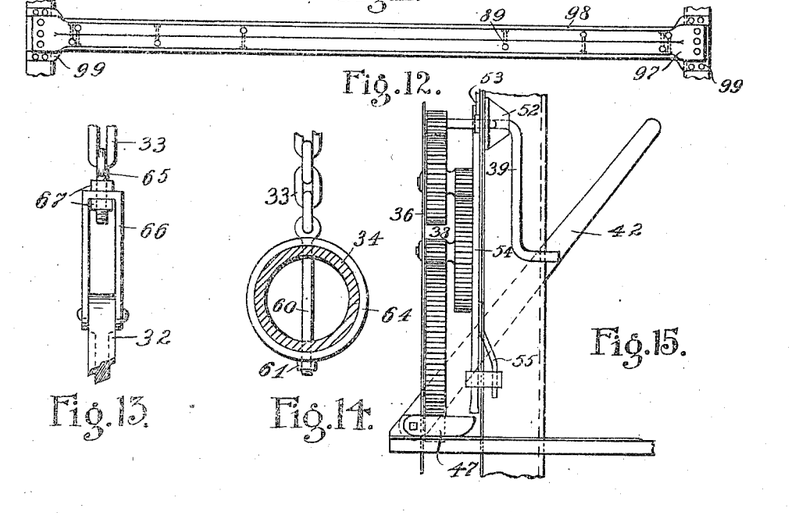
Fig. 12 is a plan of the cross brace for the car sides.
Fig. 13 is a detail showing the connection of the winding chain to the raising arm.
Fig. 14 is a detail showing the connection of the winding chain to its operating shaft.
Fig. 15 is a detail showing the releasing device for the raising mechanism, being a section on the line 15—15 of Fig. 5.
Figure 16:
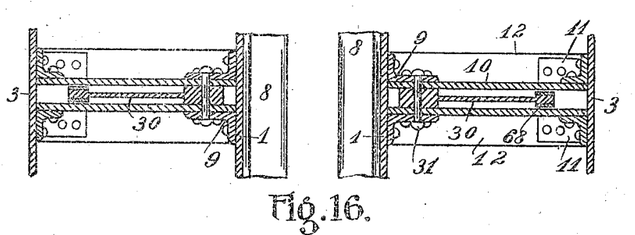
Fig. 16 is an enlarged cross section on the line 16—16 of Fig. 7.

The connections of the chains 33 with the operating shaft and with the raising arms are formed in a way to allow adjustment of these chains, so that the rotation of the operating shaft may bring the doors simultaneously into their closed position. This mechanism is best shown in Figs. 13 and 14. Through the shaft 34 extend bolts 60 which are provided with nuts 61 at one end and at the other end a flattened tubular head or eye 62, which surrounds the first link of the chain. A reinforcing sleeve 64 is provided on the shaft 34 for the chain to wind upon. Near its lower end, the chain is provided with a clevis which acts as a turnbuckle, shown in Fig. 13, and consisting of a threaded rod 65 passing into the base of the clevis 66 and adjustably held therein by nuts 67. The clevis is attached by a pin to the raising arm 30.

The bolsters 2 extend through from one side of the car to the other, and have cross webs to which the center sill plates 1 are riveted. Such cross webs are shown at 75 in Figs. 3 and 4. The bolster has a vertical web 76 with tension and compression flanges 78 and 79 along its upper and lower edges, respectively, so that it is approximately an I-beam in cross section. The ends of the plates 1 are cut out to fit into the bolster between the flanges 78 and 79, as shown in Fig. 4, the end of the plate being riveted to the cross web 75. The draft plates 80 are located in alinement with the center sill plates 1, and extend into the bolster on the other side, and are riveted to the cross webs 81.

Along the upper edges of the draft plates are angle bars 82 and 83 riveted to opposite sides thereof. The bars 82 are on the outer sides of the draft plates and have their angles extending outwardly from their upper edges. These bars pass across the top of the bolster and are then bent diagonally upward and riveted to the center sill plates 1 along their upper edges. The angle bars 83 are on the inner sides of the draft plates and have their flanges at their lower edges facing inward. These bars also extend across the bolster and are riveted to the center sill plates 1. A suitable filling plate is placed between the two bars where they cross the bolster. Angle bars 84 are riveted to the center sill plates along their inclined upper edges on the same side with the bars 83. These angle bars 84 extend far enough to overlap the inner ends of the angle bars 82, so that some of the rivets, as 85, pass through the angle bars 82 and 84, and the plates 1.

The angles 8 which are at the lower edge of the center sill plates are shown as extending entirely across the bolster,—the web being cut away at 87 for this purpose,—or these angles 8 may terminate at the bolster without passing through it. Along the outer sides of the draft plates at their lower edges are angle bars 88, which are also shown as extending through the bolster. The bars 88 and 8 may thus overlap each other and the bolster cross webs 75 and 81, and suitable rivets at these points may pass through the three members. If desired, however, these angles may terminate at the central web 76, to avoid cutting the bolster.

Figure 1:
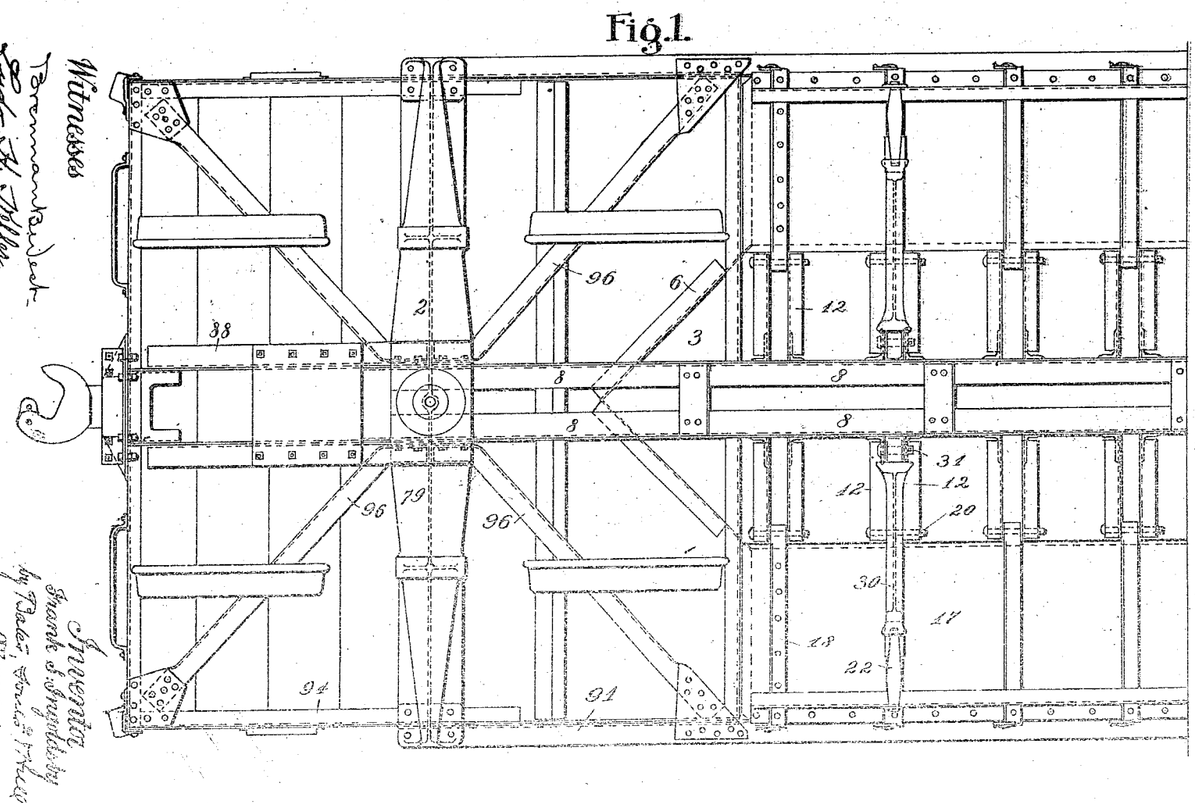
Figure 1 is a bottom plan of a portion of the car embodying my invention.
Figure 2:
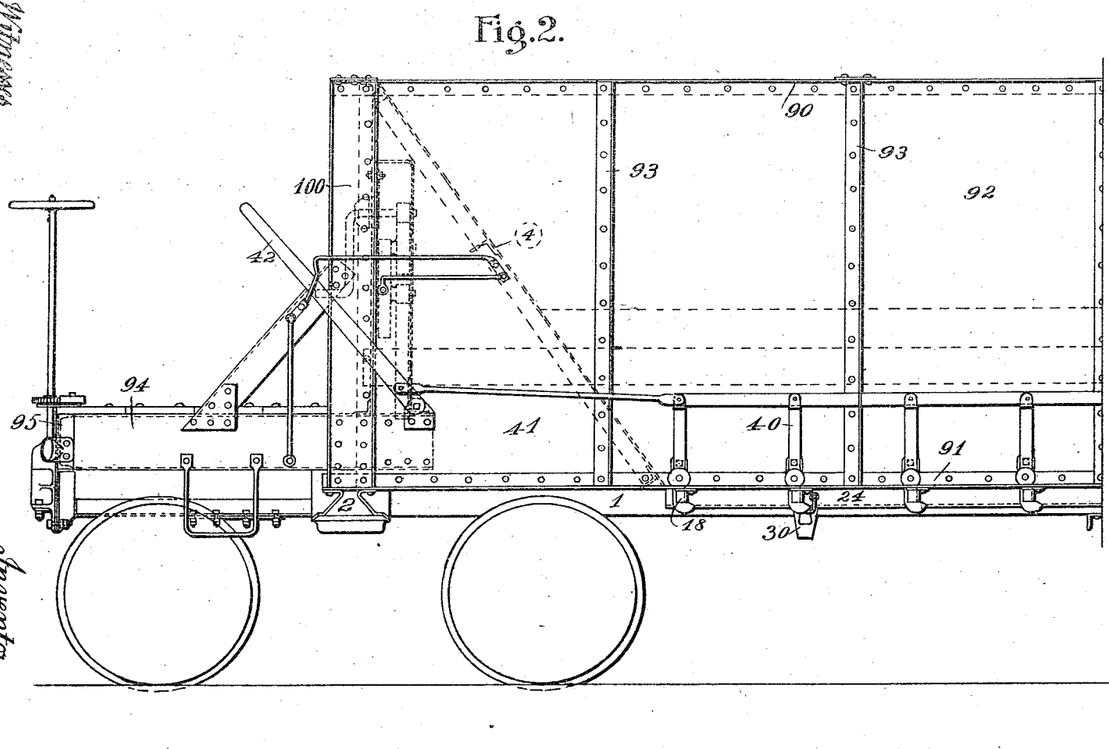
Fig. 2 is a side elevation thereof.
Figure 6:
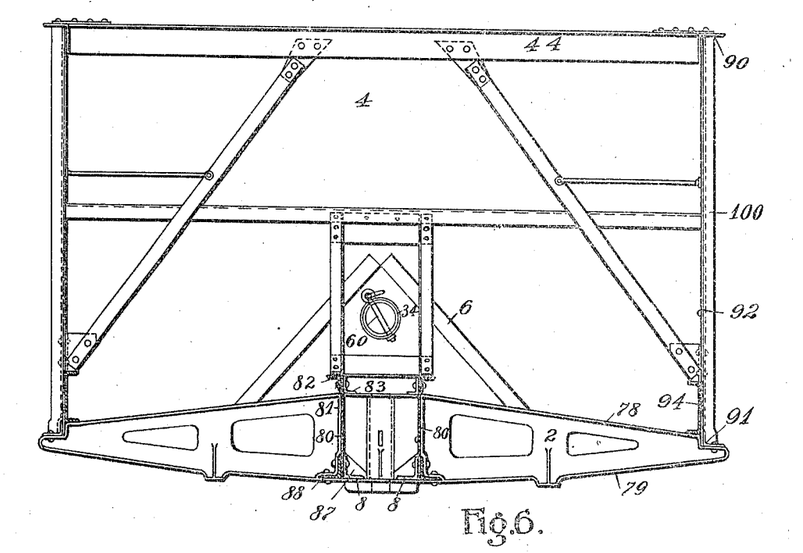
Fig. 6 is a vertical cross section outside of the bolster.

The car side is a plate-girder having an upper chord 90 and a lower chord 91, a plate 92, the main end strut 100, and the angle-bar bracing 93. The end strut 100 is a channel resting at its lower end on the horizontal flange of the lower chord. The lower chord rests on the end of the bolsters, as shown in Fig. 6, and forms a side sill of the car. An extension side sill in the form of a channel beam 94 is secured on the inner side of the car and extends across the bolster to the end sill 95. This extension-channel rests on the bolster and above it is riveted to the end strut 100 and the plate 92. Diagonal bracing bars 96 are secured to the bolster flanges 75 and 81 and extend outwardly in four directions, as shown in Fig. 1, two of them being secured at their ends by connection plates to the corners of the car and the other two by connection plates to the side sills 91 adjacent to the ends of the dumping doors. This makes a light and at the same time firm and stiff construction.

To effectively brace the car sides at their upper edges against lateral displacement inward or outward, I provide a very efficient and simple strut-tie. This is shown in Figs. 3, 7 and 12 and consists of an angle bar 97 placed in the form of a ridge across the car and having its ends flattened and riveted to the upper chord 90 of the car side, and a wooden filling beam 98 beneath such ridge and abutting the car sides and held to the angle-bar. At each end of the strut-tie, I place a stirrup 99 which passes beneath the wooden beam 98 and has its ends lying on the upper chord of the car side to which it is riveted alongside of the flattened end of the angle bar 97. These stirrups and bolts 89 hold the wooden beam in place.

The cross member holds the tops of the car sides in proper position relative to each other, so that neither will bulge outwardly or be forced inwardly. The metal part of the member acts as both a strut and tie, while the wooden part reinforces the strut action, and, at the same time, gives additional strength to resist any possible bending due to anything falling on the member, as, for example, when loading ore or rocks from a chute, or steam shovel. By placing the angular member with the apex of the angle upward, a shedding surface is supplied instead of a lodging surface, and, at the same time, both the metal and wooden members present their greatest resistance to falling loads. This method of placing the two members also presents the greatest resistance toward any side blow which the cross member might receive.

The broad idea of the cross member, composed of the angle bar and the wooden filling beam, is the invention of Mr. Joseph R. Bowling. The combination therewith of the stirrup is my invention. These stirrups make the cross member more thoroughly a beam to resist falling loads and reduce the number of bolts required to hold the beam and angle bar together, and thus minimize the weakening of the wooden beam.

Having thus described my invention, I claim:

1. In a dump car, the combination with a bolster, a draft plate on one side thereof and a center sill plate on the other, each of said plates being formed to enter the bolster and being riveted to webs thereof, and a connecting bar passing across the bolster and secured to the draft plate and the center sill plate.

2. The combination of a bolster having tension and compression flanges and a web between them, draft plates and center sill plates extending into the bolster on opposite sides between the flanges referred to, and members extending across the bolster and secured to the draft plates and center sill plates.

3. The combination of a bolster, draft plates and center sill plates extending into the bolster on opposite sides, bars extending across the top of the bolster and secured to the draft plates and center sill plates, and bars near the lower edge of such plates connecting them to the bolster.

4. The combination of a bolster having tension and compression flanges and a vertical web, a member on one side of the bolster and a sill member on the other side, said members being formed to extend into the bolster, said bolster having cross webs to which said members are secured, and a bar secured to said members and extending across the bolster.

5. The combination of a bolster having tension and compression flanges and a vertical web, of a pair of draft plates on one side of the web, a pair of alined center sill plates on the other side of said web, said plates being formed to extend into the bolster, said bolster having cross webs to which said plates are secured, and a pair of bars secured to the upper edge of each of the draft plates and extending across the top of the bolster and secured to the alined center sill plates.

6. The combination of a bolster, of a pair of draft plates on one side of the bolster, and a pair of alined center sill plates on the other side, said bolster having cross webs to which said plates are secured, and a pair of angle bars secured to the upper edge of each of the draft plates, each pair having its flanges projecting in opposite directions and extending across the top of the bolster and secured to opposite sides of the alined center sill plate.

7. The combination of a bolster, a pair of draft plates on one side of the bolster, and a pair of center sill plates on the other side, bars secured to the upper edges of the draft plates and extending across the top of the bolster and secured to the center sill plates, said center sill plates having their upper edges extending diagonally upward from the bolster, the bars mentioned bending upward along such edge, and an additional bar along the opposite side of such edge overlapping the upwardly bent bar.

8. In a dump car, the combination of a central longitudinal beam extending from bolster to bolster and having a pair of vertical plates secured at their ends to the bolster and inclined downwardly from their intermediate portions to the bolster, bars secured along such inclined edges and extending across the bolster, and draft plates to which such bars are secured.

9. In a dump car, the combination with dumping doors forming a portion of the floor of the car, of a body bolster and four diagonal brace bars, each secured to the bolster near its center and passing diagonally outward, two of said brace bars having their outer ends secured to connecting plates at the corners of the car and the other two having their ends secured to connecting plates adjacent to the outer corner of the door frame.

10. The combination with a bolster of brace bars which are bent at their inner ends and secured to said bolster, said brace bars extending diagonally outward, and connecting plates secured to a side member of the car, said brace bars being riveted to said connecting plates.

11. The combination of a bolster having lateral webs, and braces which are angle bars having their inner ends bent and secured to said lateral webs, said brace bars extending diagonally outward and connected at their ends with the car structure.

12. The combination of a plate girder side having a lower chord in the form of an angle bar, an end strut in the form of a channel beam resting at its lower end on the flange of said angle bar, and a brace between an intermediate portion of the angle bar and the center of the bolster.

13. The combination of a plate girder side having a lower chord in the form of an angle-bar, and an end strut in the form of a channel beam resting at its lower end on the flange of said angle-bar, and a bolster on which said lower chord and end strut rest and are secured.

14. The combination with a bolster, of a plate girder side whose lower chord and main strut seat on the bolster, and an additional lower side member in the form of a channel beam secured to the plate girder and to said lower chord and extending across the bolster and secured to said main strut.

15. In a dump car, the combination with the bolster and inclined end floors of the car, of a beam having a ridge and longitudinal supporting members, the latter extending from bolster to bolster, and the ridge terminating at the end floors and being secured to them, and a reënforcing beam beneath the ridge extending from end floor to end floor.

16. In a dump car, the combination with a box girder beam comprising vertical plates bent inward at their upper edges, a metal ridge secured to such inclined portions of the vertical plates, longitudinal angle bars secured to the vertical plates near their lower edges, vertical angle bars secured on the outer sides of the plates and extending approximately to the ridge, lateral plates secured to the lower portion of the projecting flanges of the vertical angle bars, said lateral plates being connected at their outer edge with the ridges.

17. In a dump car, the combination of a pair of door raising arms, a common operating shaft and chains both secured thereto, and each secured to its corresponding arm, and means for independently adjusting the effective length of the chains.

18. In a dump car, the combination with a dumping door, a spring on the underside thereof, a rub block at the back of said spring, and a raising and bumping arm adapted to engage the spring when the door drops and passes onto the rub plate as the door is raised.

19. In a dump car, the combination with a pivoted door, a pivoted raising arm, an abutment for said arm, a spring on said door adapted to engage the arm when it is against its abutment, and a rub member adjacent to the spring onto which said arm passes as the door is being raised.

20. The combination, with the car sides, of a beam between the sides, and stirrups carried by the tops of the sides and passing beneath such beam.

21. In combination, with the car sides, of a strut-tie secured to the upper edges thereof, and a stirrup secured to such upper edge of the car side and passing beneath the strut-tie.

22. The combination, with the car sides, of a strut-tie extending from side to side and secured thereto, said tie having a metal member secured to the upper edge of the car sides, and a wooden member extending between the sides, and a stirrup secured to the car side and extending beneath the wooden member.

23. The combination, with a car having a pair of plate girder sides, stirrups extending onto the tops of the upper chords of said sides and lying on the inner side of the car, a beam extending between the sides and resting in said stirrups, and a cover plate for the beam extending across the upper chords and secured to them.

24. In a dump car, the combination, dumping doors, raising mechanism therefor, including a train of gearing and a driving shaft, a trunnion block in which said shaft is mounted, a pawl adapted to engage said block and hold it in place with the gear in mesh, a bar connected with said pawl, means for releasing the doors, and a connection between said means and said bar.

25. The combination with dumping doors, of raising mechanism therefor, including a train of gearing and a driving shaft, a supporting plate having a pair of brackets, a block in which the driving shaft is mounted having trunnions extending into said brackets, a pawl pivoted to said supporting plate and adapted to engage the upper side of the trunnion block to hold the gearing in mesh, a depending bar connecting with said pawl, a rock shaft having a member adapted to engage said bar, a lever on said rock shaft, and mechanism for holding the door closed, adapted to be released by the movement of said lever.

26. In a dump car, the combination with the bolster, center sill plates extending from bolster to bolster, draft plates on the outer side of the bolsters, bars passing across the top of the bolsters and connecting the draft plates with the center sill plates, a shedding ridge carried by the center sill plates, and dumping doors carried by such center structure.

27. In a dump car, the combination of through bolsters having webs, draft plates on one side of the bolster riveted to said webs, center sill plates on the other side of the bolster riveted to said webs, and flanged rolled shapes extending along said center sill plates near the lower edges for reinforcing them, and members extending across the bolster and secured to both the center sill plates and the draft plates.

28. The combination of a pair of bolsters, inclined end floors between the bolsters, a longitudinal structure comprising a pair of longitudinal plates extending from bolster to bolster, a surmounting ridge to which said plates are connected and which terminates at the end floors, and stiffening means for the lower portions of said plates and longitudinal doors pivotally carried by said structure.

29. The combination of a pair of bolsters, inclined end floors between the bolsters, a longitudinal structure comprising a pair of longitudinal plates extending from bolster to bolster, a surmounting ridge to which said plates are connected and which terminates at the end floors, stiffening means for the lower portions of said plates, and transverse means for bracing the overhanging portion of the ridge and the lower portion of the longitudinal plates and longitudinal doors pivotally carried by said structure.

30. The combination of a pair of bolsters, inclined end floors between the bolsters, a longitudinal structure comprising a pair of longitudinal plates extending from bolster to bolster, a surmounting ridge to which said plates are connected and which terminates at the end floors, stiffening means for the lower portions of said plates, transverse braces between said plates and the overhanging portion of the ridge, bracing means between the two plates, and dumping doors hinged adjacent to the lower edge of the ridge.

31. In a dump car, the combination of through bolsters having webs, draft plates on one side of the bolster riveted to said webs, center sill plates on the other side of the bolster riveted to said webs, and flanged rolled shapes extending along the center sill plates near their lower edges for reinforcing them and means extending across the top of the bolster and connecting the center sill plates and draft plates.

32. In a dump car, the combination of through bolsters having webs, draft plates on one side of the bolster riveted to said webs, center sill plates on the other side of the bolster riveted to said webs, flanged rolled shapes extending along the center sill plates near their lower edges for reinforcing them, and a shedding ridge surmounting said center sill plates and connected therewith.

33. In a dump car, the combination of through bolsters having webs, draft plates on one side of the bolster riveted to said webs, center sill plates on the other side of the bolster riveted to said webs, rolled shapes extending along the center sill plates near their lower edges for reinforcing them, a shedding ridge surmounting said center sill plates and connected therewith, said ridge terminating short of the bolsters, and inclined end floors, between the bolsters, to which the ridge is secured.

34. The combination of a bolster, draft plates and center sill plates on opposite sides thereof, bars extending across the bolster and secured to the draft plates and center sill plates, and a ridge secured to the center sill plates between the bolsters.

35. In a dump car, a beam comprising two lower chord members, longitudinal vertical plates riveted thereto, an upper chord member in the form of an inverted V, combined with bolsters to which the vertical plates are secured, and inclined end floors to which the ridge is secured.

36. In a dump car, a beam comprising lower chord members, longitudinal vertical plates riveted thereto, an upper chord member in the form of a ridge, the vertical plates being bent inwardly diagonally beneath such ridge and secured thereto to reinforce the same, combined with bolsters to which the vertical plates are secured, and inclined end floors to which the ridge is secured.

37. In a dump car, a beam having an upper chord member in the form of a ridge, longitudinal vertical plates bent inwardly diagonally beneath such ridge, a reinforcing angle extending along the ridge and riveted to the inturned ends of the vertical plates and to the ridge, combined with bolsters to which the vertical plates are secured, and inclined end floors to which the ridge is secured.

38. In a dump car, the combination of a ridge forming an upper chord, lower chord members beneath the ridge, longitudinal plates connecting the ridge with such members, cross members engaging the lower chord members and the ridge, combined with bolsters to which the vertical plates are secured, and inclined end floors to which the ridge is secured.

39. The combination of a ridge, a pair of vertical longitudinal plates beneath it and riveted to it, a pair of strengthening members in the form of rolled structural shapes riveted to said plates, cross members connected to said shapes and to the ridge, combined with bolsters to which the vertical plates are secured, and inclined end floors to which the ridge is secured.

40. The combination of a bolster, a pair of draft plates on one side thereof, a pair of center sill plates on the other side, said bolster having cross webs to which said plates are secured, and members extending across the top of the bolster and secured to the center sill plates and draft plates.

41. In a dump car, the combination with dumping doors forming a portion of the floor of the car, a body bolster and four diagonal brace bars each secured to the bolster near its center and passing diagonally outward, two of said brace bars being connected at the corners of the car and the other two connected adjacent to the outer corner of the door frame.

42. In a dump car, the combination with a body bolster having lateral webs and four diagonal brace bars secured to such webs and bent diagonally outwardly and secured at their outer ends adjacent to the car side.

43. In a dump car, the combination with a dumping door, of a raising arm, and a spring on the underside of the door adapted to engage said arm.

44. In a dump car, the combination with a dumping door, of a raising arm, a spring on the underside of the door adapted to engage said arm, and an abutment which said arm may engage when down.

45. The combination, with a bolster, draft plates and center sill plates on opposite sides thereof, members connecting the said plates which extend across the bolster, and an inverted V-shaped ridge coöperating with the center sill plates between the ends of the car.

46. The combination, with a bolster, draft plates, and center sill plates on opposite sides thereof, members connecting the said plates which extend across the bolster, an inverted V-shaped ridge coöperating with the center sill plates between the ends of the car, and longitudinally extending doors pivotally supported from the ridge member.

47. In a dump car, the combination, with a central longitudinal beam extending from bolster to bolster comprising a pair of vertical plates, draft plates extending from the bolster to the end sill of the car, bars extending across the bolster and secured to the ends of the vertical plates and draft plates which are adjacent each other, and a V-shaped ridge member supported upon the upper ends of the vertical plates.

48. In a dump car having inclined end portions, a central longitudinal sill member comprising a pair of vertical plates supported at their opposite ends upon the bolster, draft plates extending from the bolster to the end sill, and members crossing the bolster and secured to the adjacent ends of the vertical plates and draft plates, and an inverted V-shaped ridge supported upon the upper ends of the vertical plates and secured at its ends to the inclined end portions of the car.

In testimony whereof, I hereunto affix my signature in the presence of two witnesses.

FRANK S. INGOLDSBY.

Witnesses:
   MARY D. WHITCOMB,
   JOSEPH R. BOWLING.